United States Patent
Claunch

[15] 3,673,614
[45] July 4, 1972

[54] SEWAGE DISPOSAL SYSTEM WITH REUSABLE FLUSH MEDIUM

[72] Inventor: Robert W. Claunch, New Orleans, La.

[73] Assignee: Chrysler Corporation, Highland Park, Mich.

[22] Filed: Dec. 21, 1970

[21] Appl. No.: 99,865

[52] U.S. Cl..............................................4/10, 4/77, 4/90, 4/131, 210/152, 210/167
[51] Int. Cl..................E03d 3/00, E03d 5/014, E03d 5/016, E03d 5/10
[58] Field of Search...............................4/8, 9–10, 114–118, 4/131, 79, 89, 90; 210/154, 167

[56] References Cited

UNITED STATES PATENTS

| | | | |
|---|---|---|---|
| 1,303,358 | 5/1919 | Montgomery | 4/10 X |
| 2,724,837 | 11/1955 | McPherson | 4/10 |
| 2,858,939 | 11/1958 | Corliss | 4/10 X |
| 3,079,612 | 3/1963 | Corliss | 4/10 |
| 3,379,311 | 4/1968 | Kulka | 210/152 X |
| 3,431,563 | 3/1969 | Rascor | 4/1 |
| 3,538,517 | 11/1970 | Cornish et al. | 4/10 |
| 3,579,646 | 5/1971 | Lekberg | 4/10 |
| 3,597,769 | 8/1971 | Brainard et al. | 4/10 |
| 3,032,776 | 5/1962 | Obert et al. | 4/131 X |

*Primary Examiner*—Henry K. Artis
*Attorney*—Talburtt & Baldwin

[57] ABSTRACT

A sewage disposal system comprising a flush medium separation and distribution sub-system and a final sewage disposal sub-system. The disposal system is connected directly to existing plumbing. Sewage is transmitted from commodes and the like to a separation tank where the sewage is separated from the flush medium. A reusable flush medium replaces water to facilitate the separation process. The sewage is transferred to the final disposal sub-system and the flush medium is re-cycled for re-use.

23 Claims, 3 Drawing Figures

United States Patent
Claunch
[15] 3,673,614
[45] July 4, 1972
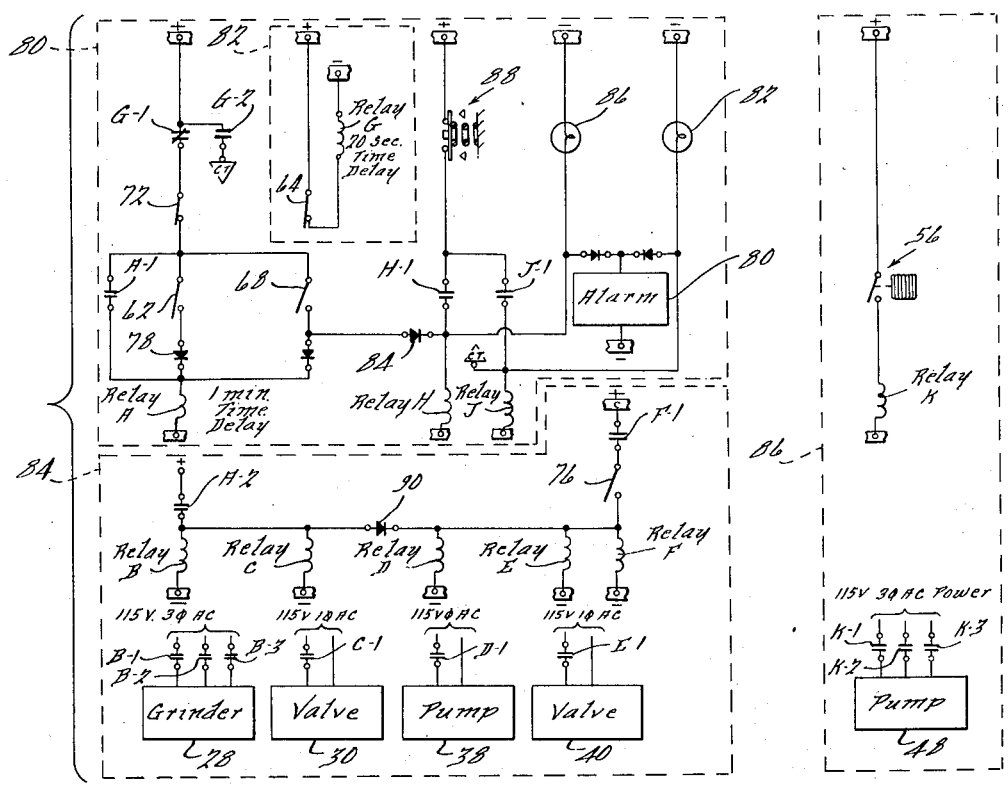

INVENTOR.
Robert W. Claunch
BY
Talburtt & Baldwin
ATTORNEYS.

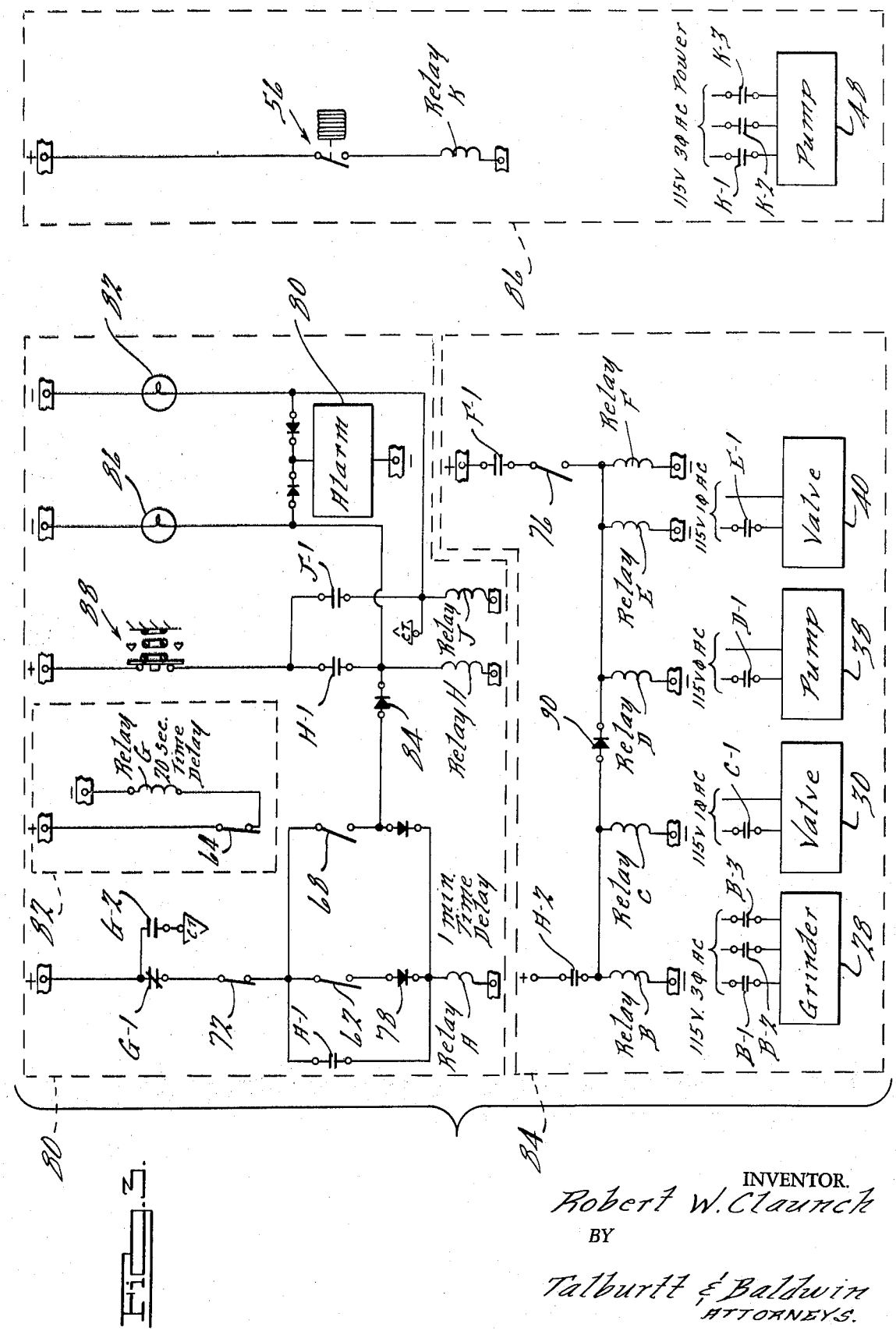

SEWAGE DISPOSAL SYSTEM WITH REUSABLE FLUSH MEDIUM

BACKGROUND OF THE INVENTION

In the conventional sewage treatment disposal system the flush medium is water and represents 90 to 98 percent of the total volume of the sewage. If a reusable flush medium is used which permits separation of the sewage wastes from the flush medium a more compact and efficient sewage disposal system results. When the term "sewage" is used herein, it is meant to include any of the typical forms of sewage generally encountered including human excreta, paper, cigarette butts and the like.

Systems with reusable flush medium have been previously proposed wherein the flush medium is of a density different than that of the sewage, the sewage being for the most part water. However, none of these prior proposals have, insofar as is presently known, been successfully developed for actual practical use.

SUMMARY OF THE INVENTION

This invention provides a practical system and apparatus for disposing of sewage while eliminating the use of water as a flush medium and substituting a reusable medium therefor. To accomplish this objective, the flush medium selected must be substantially immiscible with water, of a sufficient difference in density from that of water and sewage to permit physical separation of the sewage from the flush medium and it must be chemically stable at the operating conditions of the sewage facility and in the presence of sewage.

It is a primary objective of the invention to provide a practical apparatus and system for flush medium collection and to achieve substantially complete separation of the flush medium from the sewage by a simple and inexpensive means.

To accomplish these and other objectives the flush medium is recycled through a fluid circulation means to a point of use, such as a commode, then flushed with sewage through a sewer line into a separating tank, where the flush medium is separated from the sewage and returned to the fluid circulation means. The sewage, which in most cases will consist of human excreta and other normal commode or urinal deposits as previously stated, may be received in a standard toilet bowl from which it is flushed with the flush medium to the separating tank where the sewage is transferred after separation from the flush medium to a point of ultimate sewage disposal such as an incinerator, aerobic digestor or even simply to a holding tank or any other suitable means.

More specifically, the preferred system transfers sewage to a combination sump and flush medium storage and separation tank wherein separation of the flush medium from the sewage takes place. Sewage carried by the flush medium enters the sump where the sewage, due to its difference in density, settles to the bottom of the sump while the flush medium rises above the sewage and is thereby separated therefrom.

The sewage collects in the bottom of the sump until a sufficient quantity has accumulated to activate an automatic transfer means such as a waste grinder and a sump valve. Sewage then passes through the grinder and valve into a sewage receiving means, such as a catch tank. After the sewage has been transferred the sump valve automatically closes and the accumulation of sewage in the sump starts again. The sewage that has been passed through the grinder is automatically transferred from the catch tank to a point of ultimate disposal, such as an incinerator.

After the flush medium rises above the sewage in the combination sump and storage tank, it passes through suitable filter means and into a fluid circulation system which will preferably include a pressurized storage tank. Pressure switch means is used to automatically activate a pump in the circulation system when the pressure drops below a pre-set minimum.

In the preferred embodiment of the invention the flush medium is supplied on a demand basis to the sewage system at flow rates and pressures which are comparable to those presently used on water flush systems.

The system and apparatus of the invention has many advantages. For example, it may be conveniently packaged for portable use in trailers, ships and the like. It utilizes a minimum number of components, most of which are commonly available. Also, its operation is essentially automatic with provisions to ensure waste disposal operation at all times.

BRIEF DESCRIPTION OF THE DRAWING

FIG. 3 is an electrical schematic showing preferred control and operating circuits for an automatic system and apparatus according to the present invention.

DESCRIPTION OF THE PREFERRED EMBODIMENT

Figure 1:
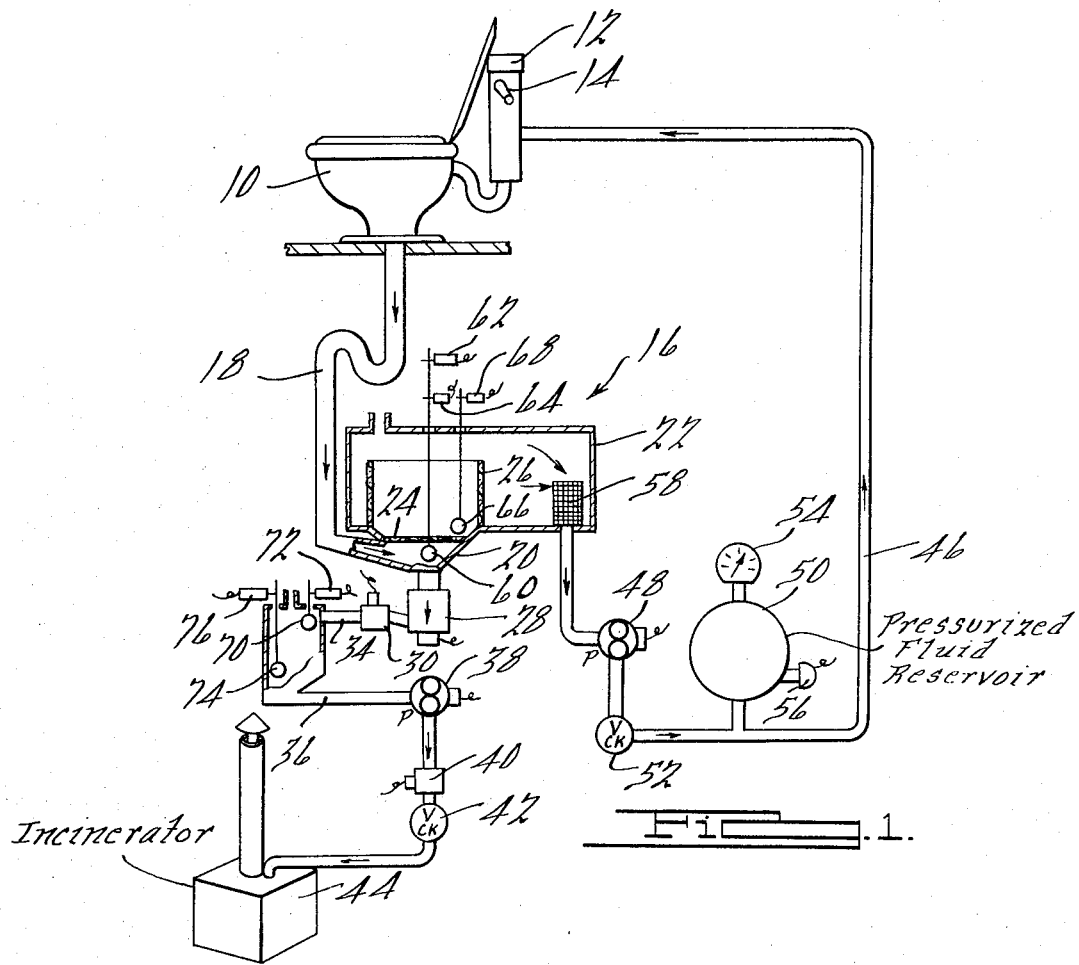
FIG. 1 is a schematic representation of a sewage disposal system and apparatus according to the present invention.

A sewage disposal system and apparatus according to the invention is shown in FIG. 1 connected to a commode 10 which includes a water closet tank 12 for storing a supply of flush medium to be used in the commode. Tank 12 includes a valve (not shown) for controlling the flow of flush medium through the commode and the sewage system as is well known in the prior art. The valve is operated by a suitable means such as manually operated handle 14. Generally indicated at 16 is a separating tank connected to commode 10 by means of a sewer line 18. Sewage enters separating tank 16 through a lower or sump portion 20 which is separated from an upper or storage portion 22 by means of a screen 24 which is horizontally positioned therebetween. Additional screen means 26 may also be arranged around the opening between the upper or lower portions of the tank as shown.

When the system is initially placed in operation, a fluid flush medium having a density less than that of water is placed in the separating tank 16. As will be described hereinbelow, the flush medium is circulated through a flush medium circulation system to arrive at the commode and is there used to carry sewage into sump 20 of separating tank 16 via line 18. When the mixture of flush medium and sewage enters sump 20, the flush medium being of the lesser density tends to rise through screen 24 and screen means 26 into upper portion 22 of tank 16 thus separating itself from the sewage which remains in the lower sump portion 20. In actual practice, the flush medium floats on top of the sewage.

Sewage transfer means including an electrically operated grinder or macerator 28 of any of the types well known in the art and an electrically operated sump valve 30 are connected by means of a sewer line to the bottom of sump 20. Sewage receiving means such as tank 32 having an upper inlet 34 and a lower outlet 36 is connected to the sewage transfer means to receive sewage from tank 16.

Additional electrically operable sewage transfer means is connected to sewage receiving tank 32 at outlet 36 and includes an electrically operable pump 38 and another electrically operable valve 40 both of which are connected to tank 32 by a suitable sewer line as shown. A check valve 42 is included in the line which, as shown, terminates at a point of ultimate sewage disposal such as incinerator 44.

Since suitable types of electrically operable valves and pumps will be apparent to those familiar with this art, there is no need to describe these components in detail. Furthermore, the means for ultimate or final disposal of the separated sewage may take the form of any various means such as thermal reduction by incinerators or the like, biological treatment by aerobic digestors or the like, bulk storage in holding tanks or any other suitable means.

The fluid circulation means for recirculating and using the reusable flush medium generally extends between the upper portion 22 of separating tank 16 and the point of ultimate use of the flush medium, which in this case is tank 12 and commode 10. As shown in FIG. 1, a line 46 extending between upper portion 22 of separating tank 16 and commode tank 12 includes an electrically operable pump 48, a pressurized fluid reservoir means or accumulator 50, and a check valve 52. The accumulator or pressurized fluid reservoir 50 is shown with a pressure gauge 54 and an electrical pressure sensitive switch means 56 mounted thereon. Various means for filtering the flush medium may be included in line 46. For example, a coalescere filter 58 is shown which in combination with screen 24 and 26 will provide substantial filtering of the flush medium. Screen 24 may be 40 mesh while the screen in 26 may be 20 mesh. A coalescere is a device or material which tends to accumulate trace quantities of water in the medium into large droplets which finally attain a size that will cause the water drop to fall through the flush medium to the bottom of the tank. A fiberglass insulation pad may be used for this purpose. It has the added advantage in that it tends to collect particulate matter and therefore acts as a filter also. Additional filter means of various types may be included at various points in line 46. Also, the flush medium is desirably further maintained by the periodic additions of biological agents thereto for germ control. Various odor masking agents may also be periodically included and the fluid may even be colored by artificial agents if desired for psychological reasons.

Operation of the system is essentially automatic due to the various level sensing means which are positioned in separating tank 16 and sewage receiving tank 32 and various electrical circuit means including both control and operating circuits which inter-connect the electrically operable sewage transfer means and the like between separating tank 16 and sewage receiving tank 32, between sewage receiving tank 32 and the point of ultimate sewage disposal such as incinerator 44 and also in the flush medium circulation line 46.

More specifically, level sensing means such as a float assembly including float 60 operably connected to a normally open electrical switch means 62 is positioned within sump 20 below screen 24. When sewage is received in separating tank 16 float 60 is constructed and so arranged as to close switch means 62 at a predetermined level in the tank, such as a level which is co-extensive with the plane of screen 24. Float 60 may also be operably connected to a normally closed electrical switch means 64, that when separating tank 16 is empty of sewage, although there may very well be fluid flush medium present therein, the float will open switch means 64. These ends are accomplished by providing a float having a density which is heavier than that of the flush medium but lighter than that of the sewage so it will float in the sewage but not in the flush medium. Such a float may be of a hollow metal construction similar to the float used in a commode water tank. Ballast is added to the float rod such that the volume the float displaces supports a weight equivalent to a volume of fluid with a mean specific gravity of say approximately 0.95. Thus with a flush medium of 0.85 specific gravity and the sewage at approximately 1.0 specific gravity, enough of the float will sink into the sewage phase so that the average specific gravity of the fluid displaced is 0.95.

A back-up sewage level sensing means such as another float assembly including float 66 and normally open electrical switch means 68 is also included in separating tank 16. However, it is positioned above separating screen 24. Float 66 is of the same type as float 60 and will indicate, due to its position in the upper portion 22 of separating tank 16 when it closes switch means 68, that sewage has risen in excess of a predetermined desirable level in separating tank 16. All of the electrical switch means are arranged to provide control inputs to electrical circuit means which are described further hereinbelow.

Additional level sensing means which is positioned in sewage receiving tank 32, may also take the form of additional float assemblies. More specifically, float 70 operably connected to normally closed electrical switch means 72 is positioned in an upper portion of sewage receiving tank 32, preferably on a level which is essentially the same as inlet 34, to signify filling of sewage receiving tank 32 with sewage and to provide a control input into a control circuit connected to the switch means 72 as is described hereinbelow. Another float assembly including float 74 operably connected to a normally open electrical switch means 76 is also included in sewage receiving tank 32. Float 74 is positioned near the bottom of tank 32 and is arranged to close normally open switch means 76 when the tank is emptied to a predetermined level near the bottom thereof.

Figure 2:
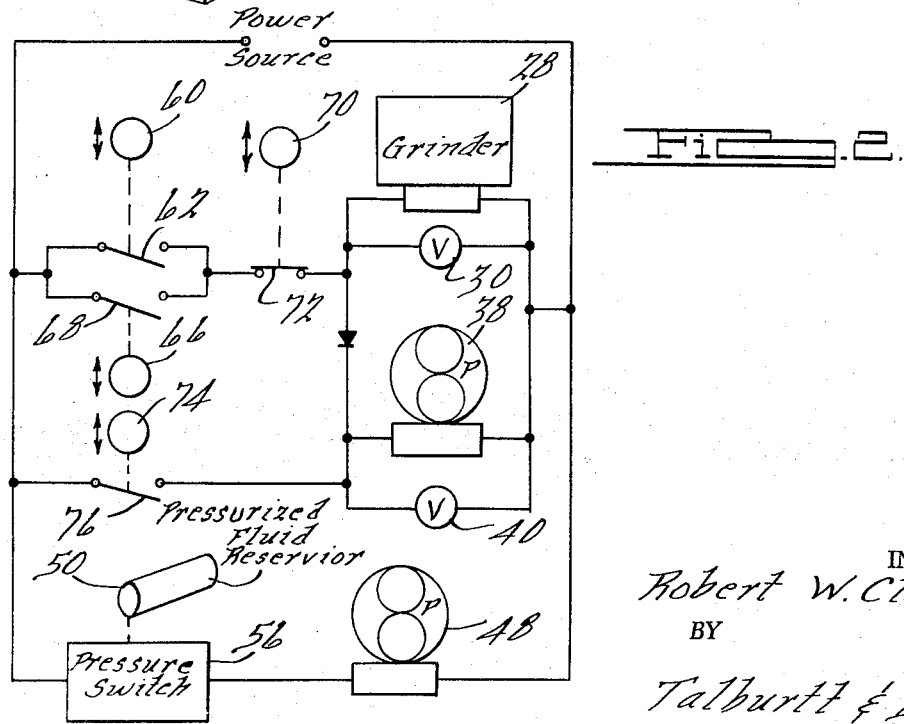
FIG. 2 is a pictorial functional representation of some of the basic functional control components for the system and apparatus.

Reference is now made to FIG. 2 for a brief description of the various control and operational inter-relationship of the system and apparatus according to the present invention. FIG. 2 shows that switch means 62 and 68, which are operated by floats 60 and 66 respectively, and switch means 72, which is operated by float 70 control the operation of grinder 28 and sump valve 30 thereby transferring sewage from sump 20 to sewage receiving tank 32. Pump 38 and valve 40 are also operated at this time. Once operated, pump 38 and valve 40 are controlled by switch means 76, which is operated by float 74, thereby transferring sewage from tank 32. Also, pressure sensitive switch 56 and accumulator 50 are arranged to activate electrically operable pump 48 and maintain pressure in line 46 at a predetermined level, such as at 40 psi, as indicated in FIG. 2.

With the above in mind, the operation of the system may be described generally as follows. Waste products and flush medium are transferred from commode 10 to sump 20 through common sewer line 18. When the mixture enters sump 20, sewage products sink to the bottom thereof and the flush medium rises from sump 20 through coarse screen 24 into the separation and storage section or upper portion 22 of separating tank 16. Sewage products continue to collect in sump 20 until a sufficient quantity causes float 60 to actuate switch means 62 starting grinder 28 and opening electrically operable sump valve 30. The sewage then passes through grinder 28 and valve 30 into sewage receiving tank 32. When the sewage receiving tank is full float 70 actuates switch means 72 which stops the grinder and closes the electrically operated valve 30. A back-up to the closing of the valve is provided by float 60 and switch means 64.

At the same time grinder 28 and sump valve 30 operate, pump 38 will operate and electrically operable valve 40 will open. Pump 38 then removes sewage from the sewage receiving means and delivers it to the ultimate point of waste disposal such as incinerator 44. After the sewage products are removed from tank 32, float 74 returns to its normal low position causing switch means 76 to assume its normally open condition thereby terminating operation of pump 38 and closing electrically operable valve 40. It can be seen that separation of the sewage from the flush medium and transfer of the sewage without the substantial loss of flush medium from the system is accomplished by the apparatus and controls described above.

The flush medium upon rising into upper portion 22 of separating tank 16, passes through screen filter 26 which is intended to remove suspended water and solids from the medium. Float 66 and switch means 68 located in upper portion 22 of tank 16 and above screen 24 function as a back-up level sensing means to float 60 and switch means 62 as will be described in detail in connection with FIG. 3. However, this float assembly will open sump valve 30 and operate grinder 28 when the sewage level rises above screen 24. Flush medium is stored in upper portion 22 of tank 16 until a demand is established in the pressurized portion of the circulation system, such as by the flushing of commode 10. The flush medium flows to the suction side of pump 48 where it is pumped at any desirable pressure into line 46. Flush medium flows into accumulator 50 upon being pumped. Pressure switch means 56 initiates operation of pump 48 when system pressure falls below a desirable predetermined level and it stops pump 48 at the predetermined level. Accumulator 50 in conjunction with pump 48 supplies flush medium on demand to commode 10.

Reference is made to FIG. 3 which shows a preferred arrangement in detail by which the sewage disposal system may be automatically controlled. For purposes of explanation and convenience in diagraming, the schematic circuits of FIG. 3 are shown broken into various sub-circuits indicated by the areas enclosed by dotted lines and numbers 80, 82, 84 and 86 respectively.

Electrical circuit means 80 is preferably connected across a 24 volt D.C. power supply. As shown, it includes switches 62 and 68 connected in parallel with respect to each other, both being serially connected to switch 72 and a relay indicated at A, which preferably includes a time delay such as a one minute time delay. Relay A is provided with a first set of normally open contacts A-1 in sub-circuit 80 and a second set of normally open contacts A-2 in sub-circuit 84. A diode 78 may be included between relay A and switch 62 as shown. Alarm and failure modes are included in sub-circuit 80 and are controlled by relay contacts G-2 which are operated by relay G of sub-circuit 82. Relay G is also connected to a 24 volt D.C. power source and preferably includes a time delay such as a 20 second time delay. Relay contacts G-1 are connected in series between the positive side of the 24 volt D.C. source and switch 72 while contacts G-2 are connected between the positive side of the 24 volt D.C. source and a point intermediate relay J and the normally open contacts J-1 thereof via the common terminals indicated at CT. Relay J is arranged as shown to control the operation of an alarm 80 and a light 82 when contacts G-2 close indicating that separating tank 16 is empty. Relay H and its normally open contacts H-1 are operably connected to switch 68 via a line including diode 84. Relay H and its contacts H-1 are arranged to operate alarm 80 and an alarm light 86 to indicate that separating tank 16 is over-filling with sewage. Both relays J and H are connected through a re-set switch 88 to the 24 volt D.C. power source such that once they are energized they will remain in that condition until the re-set switch 88 is momentarily opened.

Sub-circuit 84 includes 5 control relays B, C, D, E, and F respectively which are connected in parallel to relay contacts A-2. Relays B and C are separated from relays D, E and F by a diode 90 for circuit isolation purposes. Relay B is arranged with contacts B-1, B-2 and B-3, connected into a 100 volt three phase A.C. power line to control the operation of grinder 28. Relay C is arranged with its contacts C-1 in a 115 volt single phase A.C. power line to control the operation of electrically operable valve 30. Relay D is arranged with its contacts D-1 in a 115 volt single phase A.C. line to control the operation of electrically operable pump 38. Relay E is arranged with its contacts E-1 in a 115 volt single phase A.C. power line to control the operation of valve 40. Relay F is arranged in series circuit with switch 76 while its contacts F-1 are positioned intermediate switch 76 and the positive side of the 24 volt D.C. control power source as shown.

In sub-circuit 86, pressure switch 56 is connected intermediate the positive side of the 24 volt D.C. power source and relay K. Relay K is arranged with its contacts K-1, K-2 and K-3 connected into a 100 volt three phase A.C. power line which controls the operation of pump 48.

An operating cycle is normally initiated by the closing of switch 62 in separating tank 16 by float 60 when sewage rises to a predetermined level in sump 20. Switch 62 applies the 24 volt D.C. power source to relay A if switch 72 is not operated. Relay A as noted hereinbefore is a time delay relay, preferably approximately 1 minute, which thus will not operate during sporadic surges caused by flushing. Once relay A is operated it is locked through its own contacts A-1 until switch 72 opens in response to the upward movement of float 70 in sewage receiving tank 72 indicating that sewage receiving tank 32 is full.

Redundant switches 64 and 68 are provided in case of failure of switches 62 and 72. Should switch 62 fail to function, switch 68 will close and initiate the cycle by energizing relay A and closing contacts A-1 and A-2. Should switch 72 fail to function, switch 64, which is open as long as there is sewage and/or flush medium in separating tank 16 will close and operate relay G thus causing normally closed contacts G-1 to open and normally open contacts G-2 to close. This will release relay A preventing the loss of any flush medium and will energize relay J causing alarm 80 to be activated and light 82 to be lit. Relay G as noted hereinabove is a time delay relay, preferably approximately 20 seconds, so it will not operate when float 66 is momentarily forced down during the normal emptying of separating tank 16. Relay H is energized when switch 68 closes through diode 84 to activate alarm 80 and light 86 thus indicating that separating tank 16 is over-filling with sewage. Diode 84 isolates the alarm circuit portion of 80 from the remainder thereof as shown so that switches 62, 72, 64 and 68 along with relay A are isolated from the 24 volt D.C. power applied through re-set switch 88 to relays H and J when the alarm condition exists.

When operation of the system is initiated, relay A operates grinder 28 via relay B; it operates valve 30 via relay C; it operates pump 38 via relay D, and it operates valve 40 via relay E. Grinder 28 and valve 30 remain in operation until relay A releases contacts A-2. However, pump 38 and valve 40 will "lock-in" through relay F and its contacts F-1 when switch 76 closes as tank 32 starts to fill causing float 74 to rise. Pump 38 and valve 40 remain in operation until sewage receiving tank 32 empties and switch 76 opens due to the falling of float 74.

The flush medium is circulated through the system by pump 48 which is controlled by pressure switch 56. When the system pressure falls to a predetermined pressure level switch 56 closes operating relay K and applying power to pump 48 via contacts K-1, K-2 and K-3. When the pressure in the system reaches a higher predetermined pressure the pressure switch 56 opens and pump 48 is turned off. An example of the predetermined upper and lower pressures and the pressure range has been found useful in connection with this system, is the range of 20 to 40 psi.

In general, any flush medium selected for use with the system according to this invention will be substantially immiscible with water and of a sufficient difference in density or specific gravity from that of water to permit physical separation of the sewage from the flush medium by the settling process. The flush medium will also be chemically stable at the operating conditions of the sewage disposal apparatus and in the presence of human waste and other sewage. Further characteristics of the medium are that it have flow characteristics suitable for flushing and transporting sewage, that it not produce a toxic or fire hazard and that it be esthetically acceptable in color and odor.

Some fluids which have proven to be acceptable are the Dow Corning DC 200 fluids, Shell Oil Company's Diala Ax transformer oil, Monsanto Chemical Company's MCS 997 or 996 and ordinary mineral oil. Ordinary mineral oil is a preferred fluid and has been found to be particularly satisfactory, particularly the more refined types thereof. Diala Ax is a petroleum base oil. The MCS 997 is an adipate ester. The DC 200 fluids represent silicone fluids of the dimethyl siloxane polymer type. Pertinent physical characteristics of the fluids are shown in the Table.

TABLE

| Fluid | Specific Gravity | Flash Point | Viscosity |
|---|---|---|---|
| DIALA Ax | 0.865 | 300°F | 10 CS at 77°F |
| DC 200 10 CS | 0.934 | 325°F | 10 CS at 77°F |
| 20 CS | 0.949 | 450°F | 20 CS at 77°F |
| 50 CS | 0.960 | 545°F | 50 CS at 77°F |
| MCS 996 | 0.922 | 385°F | 8.22 CS at 100°F |
| MCS 997 | 0.914 | 450°F | 14.5 CS at 100°F |

As previously indicated, the flush medium may be color marked with several attendant advantages in that color components due to urinary pigments which tend to be abstracted into the fluid medium are hidden and better visual accessment of fluid medium separation from the waste can be made. Such coloration can be imparted by oil soluble dyes which are available from textile dye manufacturers in a wide range of colors at reasonable prices. Similarily, deodorizing perfumes can be incorporated into the fluid medium to provide a pleasing odor if necessary.

The preferred mineral oil base fluid medium contemplated for use with this system is of itself incapable of providing support for bacteria or viruses. However, a certain level of entrainment at the interface of the fluid medium and the sewage in the separating tank is inevitable. Consequently, the incorporation of an oil soluble biocide is desirable to act as a "scavenger" for entrained contamination. Several such biocides have been evaluated and found satisfactory for this purpose. Biobor J. F. which is manufactured by the U.S. Borax Company is a typical example.

Having described the invention, the embodiments thereof in which an exclusive property or right is claimed are defined as follows:

1. A sewage disposal system for separating sewage from a flush medium so the medium can be reused with minimal loss, comprising:
   a non-aqueous liquid flush medium for receiving and carrying sewage, the flush medium having a specific gravity less than that of water;
   a separating tank having an inlet in its lower portion for receiving sewage carried by the flush medium, the flush medium separating from the sewage after entering the separating tank and floating above the sewage due to its different specific gravity, the sewage remaining in the lower portion of the separating tank;
   sewage receiving means for receiving sewage from the separating tank after its separation from the flush medium;
   electrically operable sewage transfer means connected to the lower portion of the separating tank for transferring the sewage from the lower portion of the separating tank to the sewage receiving means;
   first electrical circuit means operably connected to the sewage transfer means for initiating its operation;
   sewage level sensing means positioned in the lower portion of the separating tank and operably connected to the first electrical circuit means for activating it when the sewage reaches a predetermined level in the tank thereby initiating operation of the sewage transfer means and the transfer of sewage from the separating tank to the sewage receiving means;
   second electrical circuit means operably connected to the sewage transfer means for terminating its operation, and
   sewage level sensing means positioned in the sewage receiving means and operably connected to the second electrical circuit means for de-activating it when the sewage reaches a predetermined level in the sewage receiving means thereby terminating operation of the sewage transfer means and the transfer of sewage from the separating tank to the sewage receiving means.

2. The system according to claim 1 wherein the level sensing means in the separating tank and in the sewage receiving means both consist of float assemblies.

3. The system according to claim 1 wherein the sewage transfer means includes means for guiding the sewage and pump means for transferring it.

4. The system according to claim 1 wherein:
   the separating tank includes a relatively coarse mesh screen positioned therein, dividing the tank into upper and lower portions, and
   the sewage level sensing means in the separating tank is positioned in the lower portion thereof.

5. The system according to claim 4 wherein the sewage level sensing means in the separating tank includes two sensor assemblies, one being positioned below the screen while the other is positioned above the screen, the lower assembly providing the primary operating function with respect to the first electrical circuit means and the upper assembly being redundant with respect thereto.

6. The system according to claim 1 wherein:
   the first electrical circuit means includes a normally open electrical switch means operably connected to the separating tank sewage level sensing means to be closed thereby when the sewage reaches a predetermined level in the separating tank and initiates operation of the sewage transfer means, and
   the second electrical circuit means includes a normally closed electrical switch means connected in parallel with the normally open switch means of the first circuit means and operably connected to the sewage receiving means sewage level sensing means to be opened thereby when the sewage reaches a predetermined level in the sewage receiving means and terminate operation of the sewage transfer means.

7. The system according to claim 6 wherein:
   the separating tank includes a screen positioned therein, dividing the tank into upper and lower portions, and
   the sewage level sensing means in the separating tank is positioned in the lower portion thereof.

8. The system according to claim 7 wherein:
   the sewage level sensing means in the separating tank includes two sensor assemblies, one being positioned below the screen while the other is positioned above the screen, the lower assembly providing the primary operating function with respect to the first electrical circuit means and the upper assembly being redundant with respect thereto.

9. The system according to claim 8 wherein the first and second electrical circuit means are serially connected to a source of electrical power and further include:
   a relay having a winding connected serially to the normally open switch means, the relay also including a pair of normally open electrical contacts which close when the relay winding is energized by the closing of the normally open switch, and
   additional circuit means operably connecting the relay contacts to the sewage transfer means.

10. The system according to claim 9 wherein the sewage transfer means includes:
   an electrical grinder and an electrically operated valve interconnected between the separating tank and the sewage receiving means;
   an outlet for sewage in the sewage receiving means;
   an electrical pump and another electrically operable valve connected into the outlet, and
   all of the above are operably connected electrically in parallel to the relay contacts whereby operation is initiated when the relay contacts close.

11. The system according to claim 9 including:
   an additional normally closed switch means operably connected to the separating tank sewage level sensing means to open when the tank empties to a predetermined level;
   a relay having a winding; two pairs of electrical contacts;
   electrical circuit means connecting the relay winding to the switch means whereby the winding is normally energized, one set of contacts are normally closed and the other set of contacts are normally open during energization of the winding;
   electrical circuit means connecting the normally closed contacts of the normally energized winding in series circuit between the second electrical circuit means and its power source means;
   an electrical alarm circuit, and
   electrical circuit means connecting the normally open contacts of the normally energized winding in series circuit with the alarm circuit whereby power may be supplied to the alarm circuit when the contacts close due to the opening of the normally closed switch means.

12. The system according to claim 8 wherein all the level sensing means used comprise float assemblies arranged to mechanically operate the electrical switch means.

13. The system according to claim 1 wherein the sewage transfer means comprises a grinder and an electrically operated valve, and conduit means is included to interconnect the grinder and valve between the separating tank and the sewage receiving means.

14. The system according to claim 1 including:
additional electrically operable sewage transfer means connected to the sewage receiving means for transferring sewage therefrom to an ultimate point of disposal from the system;
additional electrical circuit means operably connecting the additional sewage transfer means to the first electrical circuit means so that its operation is initiated when the first electrical circuit means is activated;
further additional electrical circuit means operably connected to the additional sewage transfer means for continuing its operation after the first electrical circuit means is de-activated, and
additional sewage level sensing means in the sewage receiving means operably connected to the further additional electrical circuit means for de-activating it when the sewage receiving means has emptied to a predetermined level.

15. The system according to claim 14 wherein:
the additional electrically operable transfer means comprises pump and valve means, and
conduit means connecting the pump and valve means to the sewage receiving means near the bottom thereof.

16. The system according to claim 14 wherein the additional level sensing means comprises a float assembly positioned to operate when the sewage receiving means empties to a predetermined level.

17. The system according to claim 14 wherein the additional electrical circuit means comprises:
an electrical control circuit connected between the first electrical circuit means and the additional sewage transfer means,
an asymmetric electrical conductor connected in the circuit so as to conduct current only from the first electrical circuit means to the additional electrical circuit means;
normally open switch means closed by the additional sewage level sensing means when sewage reaches a predetermined level in the sewage receiving means;
a source of electrical energy and an electrical relay including an energization coil and a pair of normally open electrical contacts connected serially to the normally open switch means whereby the additional electrically operable sewage transfer means is "locked-in" operation after the first electrical circuit means is de-activated and maintained in operation until the additional level sensing means releases the closed normally open switch means after the sewage receiving means has emptied to a predetermined level.

18. The system according to claim 17 wherein the additional level sensing means is a float positioned near the bottom of the sewage receiving means and mechanically connected to the normally open switch means to close it when sewage rises in the sewage receiving means causing the float to rise above a normal rest position and to release the switch when the sewage level falls to a level corresponding to the normal float position or below it.

19. The system according to claim 1 including:
fluid circulation means including electrically operable pump means, fluid circulation means, connected to the upper portion of the separating tank for directing the fluid to a point of utilization.

20. The system according to claim 19 wherein:
pressurized accumulator means is included in the fluid circulation means;
a normally open pressure operated electrical switch means is connected to the accumulator means for closing when the pressure therein falls below a predetermined value;
electrical circuit means connecting the switch means to a source of electrical energy and to the pump means of the fluid circulation means whereby additional fluid is pumped from the separating tank into the fluid circulation means when the pressure therein falls below the predetermined value maintained by the pressure switch means.

21. The system according to claim 20 including check valve means positioned in the fluid circulation means at a point between the pump means and the accumulator means.

22. The system according to claim 19 including filter means positioned at the fluid entrance to the fluid circulation means and elsewhere therein for further separating sewage from the fluid before its reuse.

23. A sewage disposal system for separating sewage from a flush medium so the medium can be reused with minimal loss, comprising:
a non-aqueous liquid flush medium for receiving and carrying sewage, the flush medium having a specific gravity less than that of water;
a separating tank having an inlet for receiving sewage carried by the flush medium, the flush medium separating from the sewage after entering the separating tank and floating above the sewage due to its different specific gravity, the sewage remaining in a lower portion of the separating tank;
sewage receiving means for receiving sewage from the separating tank after its separation from the flush medium;
sewage transfer means connected to the separating tank for transferring the sewage from the separating tank to the sewage receiving means;
means operably connected to the sewage transfer means for initiating its operation, and
sewage level sensing means positioned in a lower portion of the separating tank and operably connected to the means for activating it when the sewage reaches a predetermined level in the tank thereby initiating operation of the sewage transfer means and the transfer of sewage from the separating tank to the sewage receiving means.

* * * * *

UNITED STATES PATENT OFFICE
CERTIFICATE OF CORRECTION

Patent No. 3,673,614          Dated    July 4, 1972

Inventor(s)   ROBERT W. CLAUNCH

It is certified that error appears in the above-identified patent and that said Letters Patent are hereby corrected as shown below:

In the drawings, Sheet 1, Fig. 1, reference character 32, should be added to designate the tank having an upper inlet 34 and a lower inlet 36; Sheet 2, Fig. 3, "86" should be changed to 87 and "82" should be changed to 83; "80" should be changed to 81 and "84" should be changed to 85.

Column 4, line 39, after "full", insert a comma. Column 5, line 11, after "72", insert a comma; line 28, "80" should read -- 81 -- ; same line "82" should read -- 83 -- ; line 31, "84" should read -- 85 -- ; line 32, "80" should read -- 81 -- ; line 33, "86" should read -- 87 -- ; line 69, "72" should read -- 32 -- . Column 6, line 1, after "16", insert a comma; line 5, "80" should read -- 81 -- ; line 6, "82" should read -- 83 -- ; line 10, "84" should read -- 85 --; same line, "80" should read -- 81 -- ; line 11, "86" should read -- 87 -- ; line 12, "84" should read -- 85 -- ; line 36, after "range", insert -- which -- . Column 7, line 1, after "ponents", insert a comma ; line 3, after "medium", insert a comma.

Signed and sealed this 13th day of August 1974.

(SEAL)
Attest:

McCOY M. GIBSON, JR.
Attesting Officer

C. MARSHALL DANN
Commissioner of Patents